(12) United States Patent
Bergeret

(10) Patent No.: US 8,047,500 B2
(45) Date of Patent: Nov. 1, 2011

(54) STIFFENED FLEXIBLE BAKING TIN

(75) Inventor: Nathalie Bergeret, Aix les Bains (FR)

(73) Assignee: SEB SA, Ecully (FR)

( * ) Notice: Subject to any disclaimer, the term of this patent is extended or adjusted under 35 U.S.C. 154(b) by 0 days.

(21) Appl. No.: 10/581,616

(22) PCT Filed: Jul. 5, 2004

(86) PCT No.: PCT/FR2004/001745
§ 371 (c)(1),
(2), (4) Date: Oct. 19, 2006

(87) PCT Pub. No.: WO2005/004610
PCT Pub. Date: Jan. 20, 2005

(65) Prior Publication Data
US 2007/0120039 A1 May 31, 2007

(30) Foreign Application Priority Data
Jul. 4, 2003 (FR) .................................... 03 08221

(51) Int. Cl.
B65D 6/34 (2006.01)
B28B 7/10 (2006.01)
A21B 3/18 (2006.01)

(52) U.S. Cl. ........ 249/127; 249/117; 249/134; 249/136; 249/139; 249/164; 249/DIG. 1; 220/573.1; 220/625; 220/643

(58) Field of Classification Search .................. 249/117, 249/122, 127, 134, 139, 114.1, 115, 142, 249/164, 168, 183, DIG. 1, 136; 425/DIG. 44; 220/477, 491, 641–649, 651–659, 912, 573.1–573.4, 615, 618, 626, 625; 219/621, 725–735, 762; 99/DIG. 15; 426/113, 243; 126/390.1
See application file for complete search history.

(56) References Cited

U.S. PATENT DOCUMENTS

| 497,606 | A | * | 5/1893 | Richardson | 249/136 |
| 559,788 | A | * | 5/1896 | Perrottet | 249/170 |
| 647,700 | A | * | 4/1900 | Hunt | 220/626 |
| 1,531,569 | A | * | 3/1925 | Rade | 249/102 |
| 1,643,252 | A | * | 9/1927 | McCrery | 220/620 |
| 1,713,577 | A | * | 5/1929 | Wentorf | 249/136 |
| 1,901,837 | A | * | 3/1933 | Bateholts | 220/574 |
| 2,030,344 | A | * | 2/1936 | Young | 220/4.03 |
| 2,033,574 | A | * | 3/1936 | Henderson | 99/432 |
| 2,570,524 | A | * | 10/1951 | Clough | 249/77 |
| 2,843,038 | A | | 7/1958 | Manspeaker | |

(Continued)

FOREIGN PATENT DOCUMENTS

CH 443 870 9/1967

(Continued)

OTHER PUBLICATIONS

Translation of DE 42 22 676 A1, p. 1-2.*

(Continued)

Primary Examiner — Joseph Del Sole
Assistant Examiner — Dimple Bodawala
(74) Attorney, Agent, or Firm — Young & Thompson

(57) ABSTRACT

The baking tin comprises a hollow part (1a) made of a flexible material having a side wall (3) whose upper end defines an opening (5), and a rigid reinforcement (7). Another annular or disk-shaped reinforcement (11') is linked to the bottom (2), close to the join with the side wall (3).

14 Claims, 3 Drawing Sheets

U.S. PATENT DOCUMENTS

| | | | | |
|---|---|---|---|---|
| 2,960,218 | A * | 11/1960 | Cheeley | 206/223 |
| 3,045,664 | A * | 7/1962 | Levin | 126/390.1 |
| 3,374,936 | A * | 3/1968 | Colato | 229/406 |
| 4,076,207 | A | 2/1978 | Austin et al. | |
| 4,184,421 | A * | 1/1980 | Ahlgren | 99/450 |
| 4,625,098 | A * | 11/1986 | Joe | 219/450.1 |
| 4,644,858 | A * | 2/1987 | Liotto et al. | 99/449 |
| 4,813,592 | A * | 3/1989 | Stolzman | 229/5.7 |
| 4,886,181 | A * | 12/1989 | Haines | 220/617 |
| 5,217,631 | A * | 6/1993 | Anghileri | 249/120 |
| 5,582,389 | A * | 12/1996 | Greene | 249/61 |
| 5,768,980 | A * | 6/1998 | Degen | 99/426 |
| 5,843,501 | A * | 12/1998 | Rubin et al. | 426/127 |
| 6,055,901 | A * | 5/2000 | Gantos et al. | 99/412 |
| 6,698,336 | B1 * | 3/2004 | Siegel et al. | 99/340 |
| 6,840,396 | B2 * | 1/2005 | Wuestman | 220/592.28 |
| 2001/0043977 | A1 * | 11/2001 | Llorente Hompanera | 426/523 |
| 2003/0071188 | A1 * | 4/2003 | Bruno | 249/134 |
| 2003/0116560 | A1 * | 6/2003 | Wyatt | 219/621 |
| 2004/0231527 | A1 * | 11/2004 | Brasset | 99/426 |
| 2005/0000960 | A1 * | 1/2005 | Bergeret | 219/732 |

FOREIGN PATENT DOCUMENTS

| | | |
|---|---|---|
| CH | 683091 A5 * | 1/1994 |
| DE | 739 666 | 10/1943 |
| DE | 954 755 | 12/1956 |
| DE | 42 22 676 | 1/1994 |
| EP | 1 197 149 | 4/2002 |
| FR | 1 590 193 | 4/1970 |
| FR | 2 827 494 | 1/2003 |
| GB | 697 071 | 9/1953 |
| SU | 1750562 | 7/1992 |

OTHER PUBLICATIONS

Property of POLYLITE material.*
Property of Silicone rubber.*

* cited by examiner

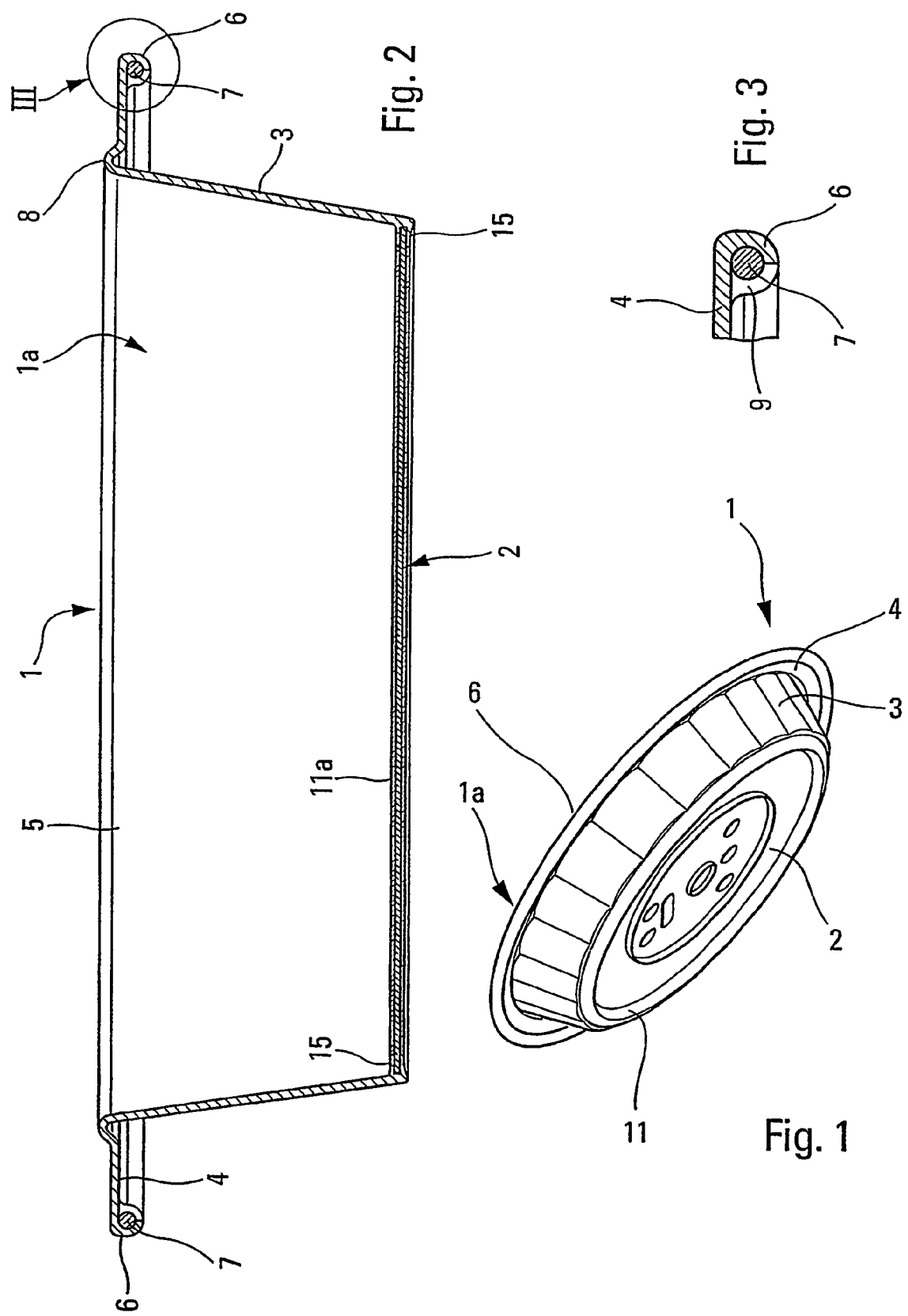

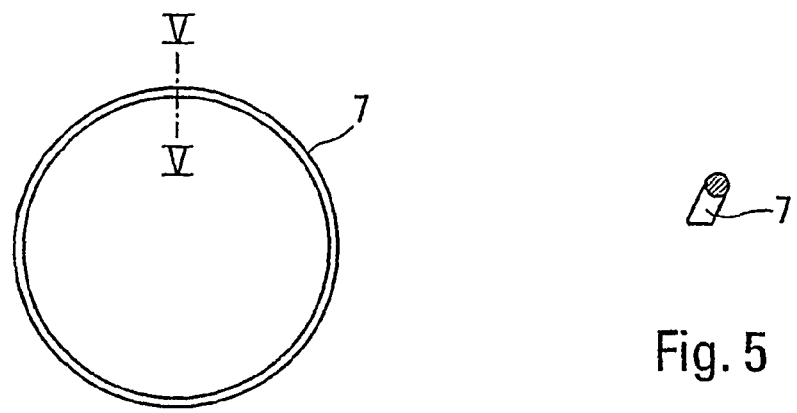
Fig. 4
Fig. 5
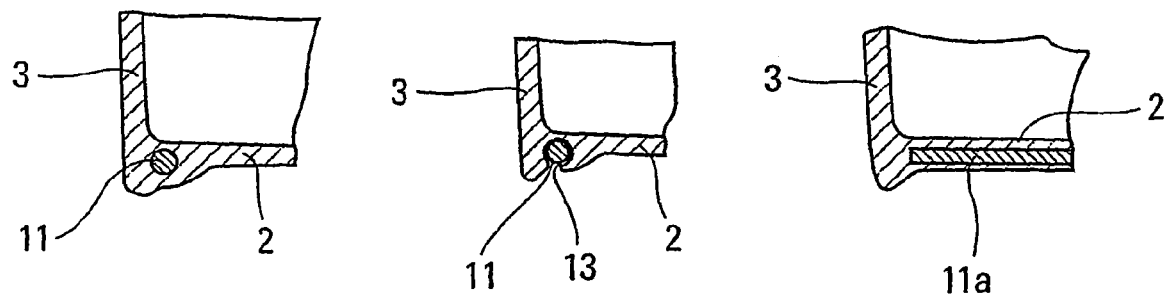
Fig. 6   Fig. 7   Fig. 8
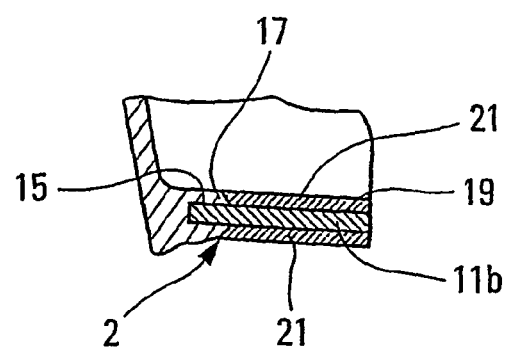
Fig. 9

STIFFENED FLEXIBLE BAKING TIN

The present invention involves a mould used for culinary preparations such as cakes, pastries etc.

We know metal moulds that are very rigid, which does not facilitate the turning out of the preparation.

We also know moulds made of silicone that have the advantage of moving between the oven, the microwave oven, the refrigerator, the freezer, and the dishwasher without undergoing any alteration, but that lack rigidity.

We can cite three inconveniences that have their origin in the great elasticity of elastomers: the turning out of the preparation is difficult, the handling of the mould is difficult, and the uncooked preparation (often liquid) may easily overflow during the handling of the mould.

Several solutions have been proposed to obtain a mould that is sufficiently supple by creating localized raised areas made of material. However, the performances obtained for the turning out and for the holding of the liquid preparation are still not satisfactory.

Patent no. FR 2 827 494 describes a mould in silicone elastomer for a culinary preparation to cook or to heat in the oven.

The turning out operates in the following manner: mould the right way up (opening at the top). Place the bottom of the mould on a support. Then exert pressure towards the bottom on the stiffener in the direction of the support, so as to bend the sides and bring the top opening approximately to the level of the bottom.

Interesting as this solution may be, it is not perfectly satisfying, particularly for the turning out of all the preparations, because the bent side wall leaves a flange protruding towards the top in the periphery of the bottom, constituting an obstacle in turning out a soft cake, for example, or the good introduction of a pie crust. Nor is the mould very stable (soft bottom/deformed upon turning out).

The problem posed here is thus one of making a new mould for culinary preparations that allows a very easy turning out of solid preparations, and, potentially, providing resistance against the deformation of the mould especially if it contains a liquid or a heavy preparation whether cooked or to be cooked.

The solution proposed is a mould for culinary preparations of the type described above characterized by that fact that it includes a rigid stiffener located in the lower part of the hollow piece (near the bottom) and connected to it.

This maintains the suppleness of the entire mould, and improves certain forms of turning out and the stability of the shape and/or the hold of the bottom.

But certain preparations may continue to pose a weight problem or even problems with turning out.

It is therefore proposed in the invention that this 'lower' stiffener should have (at least) one plate located at the base of the mould.

We also recommend that the side wall of the hollow piece should define, in the lower part, the perimeter of a bottom surface in which only a part will be occupied by the bottom wall made of an elastomer material. This wall then becomes like a ring of material that is connected peripherally to the side wall, thus with a central opening. Thus, access to the bottom plate or the interior of the mould is permitted.

If this bottom plate is extended, at the exterior periphery, approximately to the juncture between the bottom and the side wall, it will reinforce the hinge effect (as in the previous solution with the bottom ring) between the bottom and the side walls while turning out. If, in addition, internally, this plate extends to the center of the bottom of the mould, and thus occupies at least most of the bottom, this will favor the mechanical hold of the bottom, blocking the 'bulge' effect under weight and ensuring increased stability of the shape of the mould at the bottom, in all circumstances.

One aspect of the invention involves the connection between the hollow piece and the stiffener at the bottom, when this stiffener is a plate.

The preferred solution to combine quality of the turning out, cost price of the mould and ease of production, consists of the following:
- the rigid bottom plate is solid and detachable from the hollow piece and rests only on the aforementioned bottom material ring of this hollow piece, and/or
- internally, in the lower part of its lateral wall, the hollow piece presents at least one lip above this ring and the rigid bottom plate is solid and held between the bottom material ring and the protruding lip, or
- the plate is joined by moulding to the hollow piece by its periphery where it is held in place by a peripheral groove of the hollow piece that forms an internal rim.

To favor the stability of a ring-shaped bottom made of elastomer and/or of the bottom plate under thermal constraints, we recommend:
- the material bottom ring of the hollow piece presents different thicknesses, and/or
- externally this material bottom ring has an approximately flat face and internally a face with a ring-shaped ledge, so that it is thicker in the periphery than in the central part, and the rigid bottom plate, placed in the hollow piece, approximately follows the surface defined by this interior face of the material bottom ring, in such a way that this rigid plate presents two opposite curvilinear faces between the center and the periphery.

Thanks to all or part of the characteristics discussed above, two turning out techniques are particularly advised.

In the first case, pressure should be applied on the mould tending to bring the level of the bottom wall closer to that of the "upper" stiffener bordering the opening, bending the side wall of the mould so that it turns inside out and the bottom wall passes above the level of the upper edge of the mould.

In the second case, the mould is first placed upside down, then the two stiffeners are pressed on to bring the bottom closer to the opening, thus expelling the preparation from the mould.

A third method may also be used: turning out by standing the mould with its opening at the top, resting against something else, and turning it over.

In all these cases, the rigidity of the mould unit is sufficient to make it possible to use gripping utensils such as removable handles.

Other special features and advantages of the invention appear in the description below of one embodiment of this mould, which is given by way of example and is not limiting.

In terms of the drawings presented:

FIG. 1 represents a three-quarter perspective view of the underside of a mould according to the invention;

FIG. 2 represents a cross-sectional view along the line II-II of FIG. 1;

FIG. 3 shows detail III of FIG. 2;

FIG. 4 represents a view from above, and shows the rigid stiffener used in a mould according to the present invention;

FIG. 5 represents a cross-sectional view along the V-V axis of the stiffener of FIG. 4; and FIGS. 6 to 13 each represent a local cross sectional view of one possible way of producing the mould, using the same axis as in FIG. 2.

Figure 10:
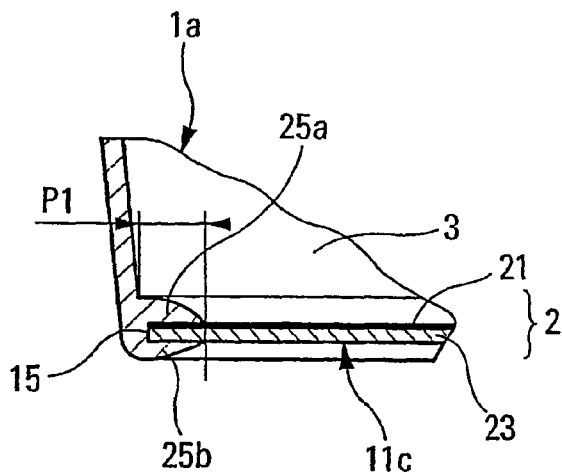

As we can see in particular in FIGS. 1 and 2, The mould for culinary preparation 1 according to the present invention is presented as a hollow piece 1a made of a supple (easily shapeable) elastomer (that is, with elastic characteristics) material, for example, silicone. This hollow piece forms the receptacle inside which the culinary preparation may be placed. It includes a bottom wall 2, a side wall 3 which stands up from the bottom and preferably an upper rim 4 that forms an external ledge for rigidity and to give something to grip onto. The ledge extends in a radial fashion from the upper part of the side wall 3, around the opening 5 (the piece is assumed to have a circular cross section in this area).

The mould 1 may be of different shapes: round, rectangular, elliptical etc.

If it is round, as shown, for an opening diameter 5 of the order of 240 mm, the thickness of the rim 4 is in general between 0.5% and 1.5% of this diameter, and preferably 1%. In the preferred embodiment of the invention, the thickness of the rim 4 is of the same order of size as the bottom wall 2 and the side wall 3, and preferably is between 1 mm and 4 mm.

The upper edge of the side wall 3 defines the opening 5 in which the preparation may be introduced into the piece 1a. The ring-shaped edge 6 of the upper rim 4, located at the opening 5 has a first rigid stiffener 7 (or upper stiffener).

For example, the stiffener 7 may be made of a plastic material (particularly a type PA 6.6 thermo-set material) or a metal such as stainless steel or aluminum. In particular, the stiffener 7 may be a wire with a diameter of between 1 mm and 5 mm.

The stiffener 7, advantageously placed around the entire mould periphery, is located at the same level as the opening 5. It is connected to the side wall 3 only through the rim 4, at a distance from the opening 5. This distance is typically between 10 mm and 40 mm. For a mould with an opening 5 with a diameter of 240 mm and with a height of about 50 mm, the stiffener 7 will preferably be located at a distance from the opening 5 equal to between 0.08 and 0.14 times this diameter, and preferably 0.12 times.

In the embodiment illustrated, the rim 4 is connected to the top part of the side wall 3 through a flange 8 that is convex upwards.

This area 8 helps with removing things from the mould, by initiating curvature of the side wall 3 to allow the removal. Thus the greatest effort, required to break the angle between the rim 4 and the side wall 3 is no longer necessary.

In the example shown in FIGS. 4 and 5, the shape of the stiffener 7 is circular, including in cross-section.

In the example shown in the figures, the rim 4 is formed continuously and is made of the same material as the piece 1a. However, a removable rim 4 could be used.

In FIG. 1, the stiffener is embedded in the material forming the rim 4, at the location of the excrescence projection 6 at the radial end of it. In FIGS. 2 and 3, the stiffener 7 is fixed in a detachable fashion to the rim, by forced fitting in a peripheral groove 9 partially open towards the inside.

Although not shown in the figures, it is possible to have some device close to the stiffener 7 which can work together with removable gripping utensils.

The mould described above typically corresponds to the mould disclosed in FR-A-2 827 494.

The mould according to the invention is different from the mould described in the prior application, particularly due to the presence of another rigid stiffener in 11, 11a, 11b, 11c, and 11d respectively in FIGS. 1, 2, 9, 10, and 11.

This second stiffener is located in the lower portion of the hollow piece 1a and connected to it to facilitate removal of the culinary preparation from the mould, or even to stabilize the shape of the bottom 2, when emptying the mould or when carrying a full mould.

Like the upper stiffener 7, the lower stiffener may be ring-shaped or approximately ring-shaped, with a round cross section, as shown in FIGS. 4 and 5.

In this case, it is recommended as shown in FIGS. 6 and 7, that the rigid ring 11 should be fixed to the bottom wall 2, being close to the junction between this bottom and the side wall 3.

It should be noted that in the solution in FIGS. 6 and 7, the retaining ring 11 may be embedded inside the elastomer material of the hollow piece 1a, or may be inserted into it inside a narrow-necked retaining groove 13 extending as a ring around the periphery of the bottom 2, with the access opening preferably facing outwards (under the bottom) as shown in FIG. 7.

However, the solution of an embedded ring 11 in FIG. 6 will a priori be preferred for cost reasons, for ease of washing and therefore for keeping the mould clean. Furthermore, if the stiffener is arranged in this manner, it must be present when making the hollow piece 1a itself that is typically made by moulding.

Another solution consists of using a plate at the bottom of the mould, instead of a retaining ring 11 (FIGS. 2 and 8 to 13).

The plate preferably extends over the entire surface of the bottom 2.

The connection between the piece 1a and the plate may be made in two ways in particular: either the plate is embedded in the flexible material of the piece located at the bottom 2 (FIG. 8), or the plate is connected to piece 1a at its periphery by inserting said plate into a horizontal groove 15 extending peripherally (preferably over the whole perimeter), facing the inside and belonging to a rim 17 of the piece 1a.

In both cases, the piece 1a is made by moulding.

If one wants to block the plate in relation to the piece 1a, the plate being placed in the moulding mould before adding the supple material: the shrinkage and the elasticity of the material block the plate with respect to the rim 17 in the first case. If not, the supple piece is moulded, with its groove 15, then the peripheral edge of the bottom plate 11c or 11d is engaged, so as to hold it while also allowing it to be removed, for example, for separate washing.

If the plate (11a) is embedded, this can take the form of a (metal) sheet or a rigid plastic (preferably thermo-hardened) plate.

If it is detachable in relation to the piece 1a, we recommend a "coated" plate lined at least on its upper surface 19 by anti-adhesive coating 21 such as polytetrafluorethylene (PTFE). In this case almost the entire bottom 2 is formed by a solid disk with anti-adhesive surface clipped to the piece 1a.

The advantage of a solution using plates as shown in FIGS. 2, 8, 9, and 10 to 13 compared to the ring-shaped joint solution as shown in FIGS. 1, 6, and 7 is that the bottom is stiffer and cannot deform, either when emptying the mould or under the weight of the preparation, if the plate is sufficiently rigid.

Furthermore, when emptying the mould, the user does not need to think about where to put his or her fingers on the bottom; there is always a rigid area to press on.

It should be noted that a solution with a bottom wall locally reinforced with several localized plates, if necessary connected together by a joint, may be satisfactory in this regard (this solution is not represented).

In FIG. 10, the solid plate 11c presents a rigid plate 23, lined on the upper surface with a coating that is thermal protective and/or scratchproof and/or non-stick 21. Plate 11c is clipped peripherally in the aforementioned groove 15. It should be noted that the upper and lower peripheral beads or lips (continuous or not) 25a, 25b respectively, formed by the piece 1a towards the bottom or at the base of its side wall have approximately the same depth P1 at the level of the bottom 2 of the mould.

Figure 11:
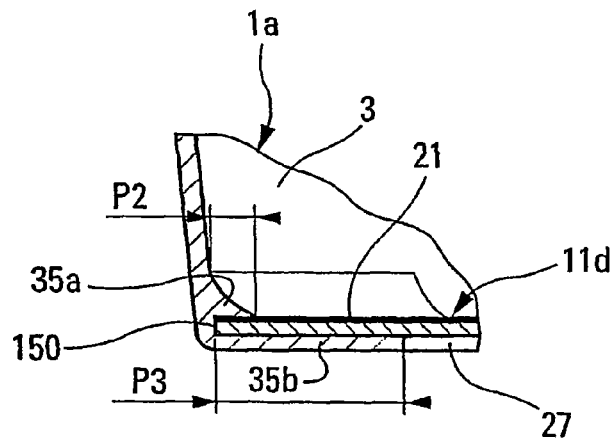

On the other hand, in FIG. 11, the corresponding depths, respectively P2 and P3, are not equal. In particular, depth P2 above the plate 11d may be small (approximately 1 to 10 mm) compared to P3 (the P3/P2 ratio is between more than one and 20/1 and preferably between 5/1 and 10/1). In this regard, it is recommended that the lower bead 35b defines a continuous, ring-shaped lower wall, limited towards the center by a hole 27 to be covered by the reinforcement plate as in 11d.

If this opening in the bottom is included (which assists with emptying the mould), the side wall 3 of the hollow piece will then define, on its lower base, the perimeter of a bottom surface in which only part is occupied by this bottom wall 35b which is then presented as a ring of material connected peripherally and therefore in a single block to the side wall 3. A bottom wall 35b of this type may be thicker (see e1 in FIG. 12) than the side wall 3 (thickness e2).

Thus, this plate will be held by a support wall (35b) and held from above by one or more narrow beads 35a which pin it against the wall 35b in normal usage, the hole 27 making it possible to push on the plate 11d from the outside, to remove it, for example for cleaning.

For best effect, and as indicated, the annular surface defined by the material ring 35b will occupy between 1/5 and 4/5, and preferably between 1/3 and 2/3, of the total surface of the bottom of the hollow piece (the surface of the reinforcement plate if this is solid and extends from the center to the border between the bottom and side wall 3).

Rather than a continuous upper lip 35a, several segments (in particular three or four) may be preferred. Then there will be a peripheral groove 150 to clip the plate, which will be non-continuous (FIG. 11).

If a bottom opening 27 is used, the bottom plate 11d will be solid. It may be removed though the hollow piece.

Figure 12:
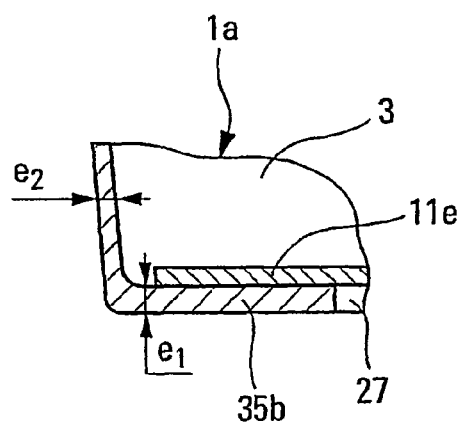

FIG. 12, a plate like this, as shown in 11e, solid and removable is resting only on the annular bottom wall 35b. There are no lips or retention beads above the plate. It is the weight of the paste (or the solid contents placed in the piece 1a) that holds the plate in the bottom of the piece. If the empty mould is turned over, the plate falls.

Figure 13:
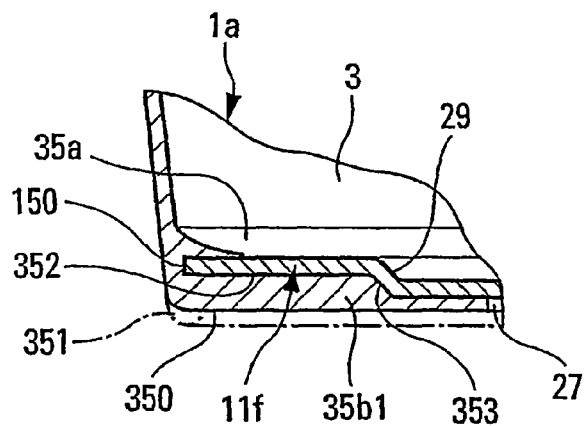

In FIG. 13, the solid bottom plate 11f presents an annular step 29 located in the middle part between its periphery and its center. The material bottom ring of the hollow piece presents different thicknesses.

The material bottom ring 35b1 of the hollow piece has an external face 350 that is essentially flat (other than possibly an external perimetric flange 351), and, internally, a face 352 which has an annular shouldering 353, so that it is thicker in the periphery than in the central part. Plate 11f approximately follows the surface defined by the internal face 352 of the material bottom ring, so that this rigid bottom plate has two opposite curvilinear faces between the center and the edge, as illustrated in FIG. 13, helping it to withstand thermal constraints.

Plate 11f may be removable. Here it has been wedged peripherally in the slot 150, between the tiered material ring 35b1 and an upper lip 35a, which may be identical to the one shown in FIG. 11, for example.

Plates 11e and 11f may be made of glass, although the other choices mentioned earlier are also possible; all the plates may also be interchanged between different embodiments.

The turning out of the mould represented in the figures may be done in two ways in particular, according to whether one empties the mould upright or upside down.

In the first hypothesis: with the mould upright and horizontal. The operator presses the upper edge of the piece 1a, of the upper stiffener 7 (if this is included), downwards and the bottom upwards, pushing on the stiffener 11 concerned. Without necessarily placing the mould on a support, the operators continues with the movement until the bottom 2 moves above the level of the opening 5, with the mould eventually turning inside out like a glove finger, if the elasticity and the shapeability of the side wall 3 allow it, to the point of separation between the plate and the piece 1a (if the plate is removable).

The retaining ring 11, and also plates 11a, then, if necessary, allow the operator to slide, a utensil along the upper wall which has been completely detached from the bottom. There is no rim to make the operation more difficult.

When being turned inside out like a love finger, the arrangement of the retaining ring or the perimeter border of the plate at the location of the slope change between the side wall 3 and the bottom 2 accentuates the hinge effect at this location.

The second hypothesis: the mould upside down, held by the user. The user presses on the periphery of the bottom and at the same time pulls on the rim 4, preferably lifting the mould slightly. The side wall folds outwards on itself. The preparation is pushed outside the mould which once again tends to fold back like a glove finger, this time downwards.

With the bottom being rigid, this preserves its shape, without buckling, so there is less risk of damaging the preparation, particularly if the preparation involved is a cake.

Even if the external edge with the rim 4 is preferred to a simple flange at the upper edge of the wall, it is possible to do without this, and the same applies to the upper stiffener 7.

If desired, as shown in FIGS. 10, 11, and 13 the bottom plate 11c, 11d, 11f may be removable.

The invention claimed is:

1. A mould for a culinary preparation, comprising:
   a flexible hollow piece made from an elastomer material and a removable rigid plate-shaped base stiffener,
   said flexible hollow piece having an upright side wall and a lower portion,
   said upright side wall being an annular continuous wall,
   said lower portion comprising a flexible lower lip projecting from a lower base of the upright side wall, holding said rigid plate-shaped base stiffener and defining with said plate-shaped base stiffener a bottom wall of the mould,
   a flexible upper lip projecting from the lower base of the upright side wall, extending above said flexible lower lip, defining with said flexible lower lip a radially opened groove in which the plate-shaped base stiffener is removably received and clipped,
   said flexible upper lip pinning said plate-shaped base stiffener against said flexible lower lip,
   said flexible lower lip being a ring-shaped wall limited towards the centre of the bottom wall by a hole that is covered by the plated-shaped base stiffener,
   said lower ring-shaped wall having an upper surface presenting a shouldering making it thicker in the peripheral part that is close to the lower base of the side wall than in a central part that is close to the hole, and
   said plate-shaped base stiffener having an annular step in order to approximately follow said upper surface of the lower ring-shaped wall on which it is disposed.

2. The mould of claim 1, wherein the lower base of the side wall is formed integrally with the lower lip.

3. The mould of claim 1, wherein said lower ring-shaped wall occupies between ⅕ and ⅘ of the total surface area of the bottom wall of the mould.

4. The mould of claim 1, wherein said lower ring-shaped wall occupies between ⅓ and ⅔ of the total surface area of the bottom wall of the mould.

5. The mould of claim 1, wherein the ratio of the length of the extension of the lower lip from the lower base of the side wall to the corresponding length of the upper lip is at least equal to 1.

6. The mould of claim 1, wherein the ratio of the length of the extension of the lower lip from the lower base of the side wall to the corresponding length of the upper lip is at most equal to 20.

7. The mould of claim 1, wherein the ratio of the length of the extension of the lower lip from the lower base of the side wall to the corresponding length of the upper lip is between 5 and 10.

8. The mould of claim 1, wherein the upper lip is a continuous lip.

9. The mould of claim 1, wherein the upper lip comprises several segments defining with the lower ring-shaped wall a discontinuous groove.

10. The mould of claim 9, wherein the upper lip comprises 3 or 4 segments.

11. The mould of claim 1, wherein said lower ring-shaped wall has a lower surface which is substantially flat.

12. The mould of claim 11, wherein said lower surface comprise a flange at the external perimeter thereof.

13. The mould of claim 1, wherein said flexible hollow piece is of one-piece construction and surrounds the removable rigid plate-shaped base stiffener.

14. A mould for a culinary preparation, comprising:
a flexible hollow piece made from an elastomer material and a removable rigid plate-shape base stiffener,
said flexible hollow piece having an upright side wall and a lower portion,
said upright side wall being an annular continuous wall,
said lower portion comprising a flexible lower lip projecting from a lower base of the upright side wall, holding said rigid plate-shape base stiffener and defining with said plate-shape base stiffener a bottom wall of the mould,
a flexible upper lip projecting from the lower base of the upright side wall, extending above said flexible lower lip, defining with said flexible lower lip a radialy opened groove in which the plate-shape base stiffener is removably received and clipped,
said flexible upper lip pinning said plate-shape base stiffener against said flexible lower lip,
said flexible lower lip being a ring-shaped wall limited towards the centre of the bottom wall by a hole that is covered by the plate-shaped base stiffener,
said lower ring-shaped wall having an upper surface presenting a shouldering making it thicker in the peripheral part that is close to the lower base of the side wall than in a central part that is close to the hole, and said plate-shaped base stiffener having an annular step in order to approximately follow said upper surface of the lower ring-shaped wall on which it is disposed, wherein
the lower ring-shaped wall occupies between ⅕ and ⅘ of the total surface area of the bottom wall of the mould.

\* \* \* \* \*